Figure 1:
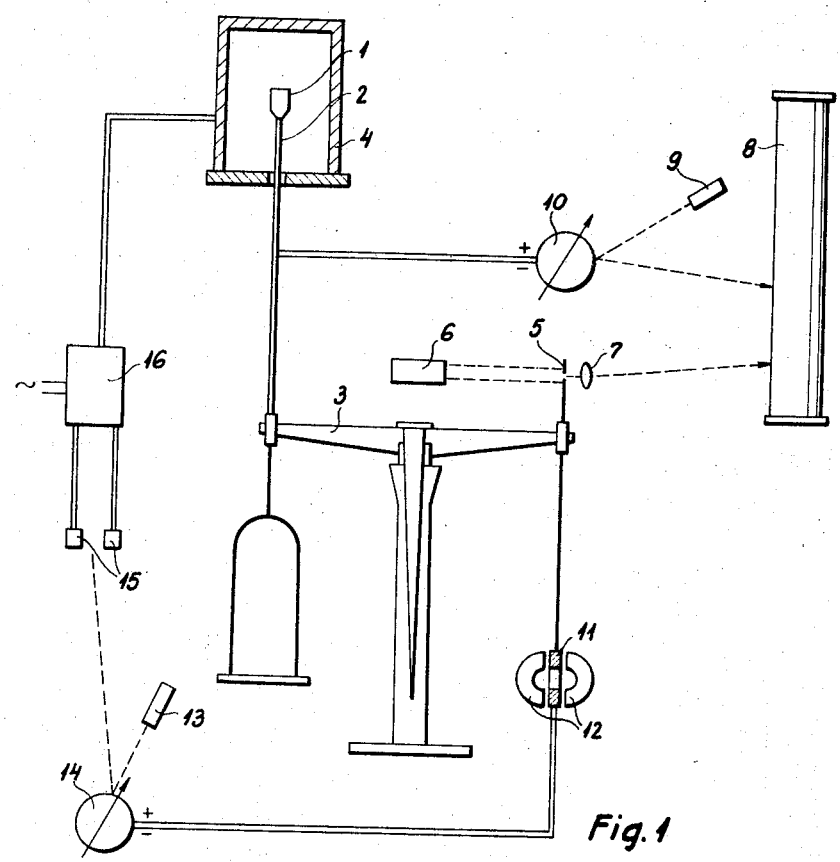

Oct. 3, 1967

L. ERDEY ETAL  3,344,654

HEATER CONTROLLER FOR ISOTHERMIC THERMOGRAVIMETRIC ANALYSIS

Filed Oct. 19, 1964

INVENTORS
László Erdey
Ferenc Paulik
Jenö Paulik

INVENTOR.

BY Irwin S. Thompson

ATTY.

United States Patent Office 3,344,654
Patented Oct. 3, 1967

3,344,654
HEATER CONTROLLER FOR ISOTHERMIC THERMOGRAVIMETRIC ANALYSIS
László Erdey, Ferenc Paulik, and Jenö Paulik, Budapest, Hungary, assignors to Magyar Optikai Muvek, Budapest, Hungary, a corporation of Hungary
Filed Oct. 19, 1964, Ser. No. 404,688
1 Claim. (Cl. 73—15)

The progress of the thermal decomposition of chemical compounds may be determined by two different methods of thermogravimetry, i.e. the dynamic or the static examination. The classic thermogravimetric method is considered a dynamic method of measurement. Its principle is as follows: The temperature of the sample (test material) is increased at a uniform time rate, and the change in the weight of the sample is measured simultaneously as a function of time. The method of so-called gradual isothermic heating is considered a static measurement method. Its principle differs from the above defined one only in that the temperature of the sample is increased extremely slowly and only if the weight of the sample changes little or not at all at a given temperature. In other words, one always waits in the latter case, until the equilibrium of the decomposition reaction is attained. Each point of the thermogravimetric curve so plotted shows the equilibrium condition corresponding to the temperature in question. The plotting of this curve is very important for getting better acquainted with the kinetics of thermal decomposition of chemical compounds. The examination is rather lengthy and may take up to several days. The heating program has so far been set only by manual adjustment, which rendered the performing of the examination extremely difficult.

The object of the invention is an apparatus for the automatic setting of the heating program. Differentiating thermobalances, i.e. thermobalances in which in addition to the change in weight of the sample, the rate of the change in weight is also registered, may be rendered suitable for automatic setting of the heating program. By means of the current generated in the differentiating element of the thermobalance, which is proportional to the rate of the change in weight, it is possible to actuate an electrical regulating device which begins to operate as soon as the sample has reached the desired rate of change in weight, i.e. when the differentiating current reaches a certain value. Said device then switches off the heating current of the oven of the thermobalance, partially or wholly, or modifies the rate and direction of rotation of the servomotor which changes the voltage of the heating current.

The apparatus according to the invention is accordingly characterized by inserting between the differentiating means of the differentiating thermobalance and the heating member of the sample, a program-controlled heat-regulating device known per se, controlled directly or indirectly by the differentiating member.

In the drawing one illustrative embodiment of the apparatus according to the invention is represented.

Figure 2:
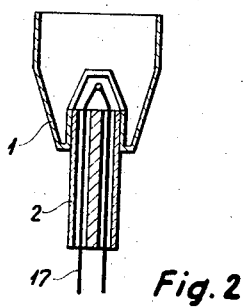

FIG. 1 shows the schematic diagram of one embodiment of a differentiating thermobalance, whereas FIG. 2 is an axial section through the sample holder on a larger scale.

The test piece arranged in the sample holder 1 loads the balance 3 by means of the porcelain rod 2. The test piece is heated by means of the electric oven 4. When the reaction starts at a given temperature and the weight of the sample begins to increase or to decrease, the beam of the balance 3 is deflected and the optical slot carried by the balance beam is displaced. If the slot is illuminated by means of a lamp 6, the image of the slot magnified by the lens arrangement 7 appears on the light-sensitive paper tape arranged on the photo-registering roller 8 and plots the so-called thermogravimetric curve, which shows the change in weight of the test piece plotted against time. The changes of temperature must also be plotted on the photosensitive paper. The temperature measurement may be performed simply in the oven or in the interior of the test piece. This latter method supplies more accurate results. The test piece is in this case arranged in a specially shaped crucible for holding the test piece. The welding point of the thermocouple inserted in the double bores of the porcelain rod 2 is situated in the inwardly bulging part of crucible 1, and measures the temperature of the test piece. A mirror galvanometer 10 is connected to the poles of the thermocouple, the mirror of the galvanometer being illuminated by the lamp 9. This arrangement serves for plotting the curve of the change in temperature. The rate of the change in weight is determined by means of a coil 11 suspended on the balance beam, a magnet 12, and a galvanometer 14 illuminated by the lamp 13. The voltage of the current induced in the coil is proportional to the rate of the change in weight. The differentiating device consisting of the members 12, 13 permits regulation of the heating of the oven in various ways, in accordance with a predetermined program.

The voltage of the heating current of the oven is increased slowly and gradually by means of a suitable programming device, until the weight of the test piece begins to increase or decrease. The deflection of the galvanometer 14 indicates a change in weight. The light signal of the galvanometer indicating the increase or decrease in weight of the test piece falls to one or the other element of a pair of photocells 15. In this manner, the photoelectric current goes to the control device 16. Here the electric signal is amplified and the heating circuit is either interrupted by means of a relay, or the motor of programming apparatus is stopped for the time until the rate of the change in weight again falls below a given value. If two series of photocells or thermocouples are arranged side by side, the regulating device may reduce the voltage of the heating current by a certain amount (by 25 or 50 percent, etc.), depending on the rate of the change in weight (increase or decrease), or depending on which photocell receives the light signal.

In a further embodiment according to the invention, there is no need for a galvanometer-photocell-arrangement for sensing the current induced in the differentiating member, but the differentiated current may be amplified in an electric amplifier and then used directly for adjusting the voltage of the heating current. By means of the amplified current, for example the servomotor of the programming device of the heating current may be controlled in accordance with the desired program. In a still further illustrative embodiment the voltage of the heating current is increased by the servomotor at a uniform rate but very slowly until the voltage of the amplified induced current falls in the range between zero and a certain value. When the induced current has surpassed the predetermined value, the regulating device is automatically actuated, this latter reverses the sense of rotation of the servomotor, and rotates the motor faster in the opposite direction, i.e. decreases the heating voltage to the same extent, as the rate of change in weight induced by the reaction deviates from the maximum permissible rate, or as the voltage of the induced current differs from the maximum permissible voltage. Thus, the oven begins to cool, the rate of decomposition decreases and even falls below the permissible maximum rate. Now the control device again starts operation and reverses the rotation of the servomotor, which starts to increase the heating voltage, and so on.

The use of the apparatus according to the invention therefore permits altering the temperature of the electrical oven heating the test piece in such a manner—approximating the desired value alternatively from above and from below—that the thermic reaction should take place in practice at the required low decomposition rate, so that the reaction equilibrium in conformity with the given test conditions may be established at any temperature.

Various embodiments of the differentiating thermobalance are possible, in addition to that ilustrated in FIG. 1. A certain class of such balances operate on the principle of measuring the change in weight, while another group operates on the zero-balance principle. Their differentiating member may also work along various lines. The rate of the change in weight is determined in certain cases by means of a transformer or a condenser-resistance, in other cases by differential measurement.

All differentiating thermobalances, however, have the common characteristic feature that a current having a voltage proportional to the rate of change in weight is generated in the differentiating means. In the case of dynamic thermogravimetric examinations this current serves the purpose of defining or recording the differentiated thermogravimetric curve. In accordance with the invention, such differentiated current may also be used for regulating the automatic heating program whenever static measurements are to be performed with the differentiating thermoblanace. In this case the differentiating thermobalance is modified according to the invention in the manner described in the above illustrative embodiment. When the differentiating means controls the device for heat regulation indirectly, then the transmitter sensing the current of the differentiating member need not necessarily be the mirror galvanometer shown in FIG. 1 and the series of photocells or thermocouples cooperating with it, but for example may be an electrical amplifier and a group of relays associated with it.

What we claim is:

Apparatus for controlling the temperature of a test piece undergoing static thermogravimetry, comprising means for heating the test piece, a thermobalance movable under the weight of the test piece, and means responsive to the speed of movement of the thermobalance to change the amount of heat supplied to the test piece by said heating means, said responsive means comprising differentiating means to control the heating means output according to said speed of movement.

References Cited

UNITED STATES PATENTS 3,045,472   7/1962   Paulik et al. _____ 73—15
3,172,493   3/1965   Von Koch et al. _____ 73—15

OTHER REFERENCES

Campbell, C., et al. "Derivative Thermoanalytical Techniques," In Analytical Chemistry, 31(7): pp. 1188–1191. July 1959.

Muller, R. H. "Instrumentation." In Analytical Chemistry. 31(1):pp. 77A–77A, January 1960.

Newkirk, A. E. "Thermogravimetric Measurements." In Analytical Chemistry. 32(12): pp. 1558–1563, November 1960.

Browne, F. L., et al. "THA and DTA of WOOD . . ." In Fire Res. ABS and Reb. Natl. Acad. Sci., Natl. Res. Coun. 4(1): pp. 76–85, January and May 1962.

JAMES J. GILL, *Primary Examiner.*

RICHARD C. QUEISSER, *Examiner.*

J. C. GOLDSTEIN, C. A. RUEHL, *Assistant Examiners.*